United States Patent
Kozhaya et al.

(10) Patent No.: US 11,537,875 B2
(45) Date of Patent: Dec. 27, 2022

(54) DETECTING AND REDUCING BIAS IN MACHINE LEARNING MODELS

(71) Applicant: International Business Machines Corporation, Armonk, NY (US)

(72) Inventors: Joseph Kozhaya, Morrisville, NC (US); Shikhar Kwatra, Durham, NC (US); Corville O. Allen, Morrisville, NC (US); Andrew R. Freed, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1084 days.

(21) Appl. No.: 16/185,715

(22) Filed: Nov. 9, 2018

(65) Prior Publication Data

US 2020/0151555 A1    May 14, 2020

(51) Int. Cl.
*G06N 3/08* (2006.01)

(52) U.S. Cl.
CPC ........................ *G06N 3/08* (2013.01)

(58) Field of Classification Search
CPC ......... G06N 3/08; G06N 3/0454; G06N 3/084
See application file for complete search history.

(56) References Cited

U.S. PATENT DOCUMENTS

| | | |
|---|---|---|
| 6,728,689 B1 | 4/2004 | Drissi et al. |
| 9,053,436 B2 | 6/2015 | Dalessandro et al. |
| 9,727,826 B1 | 8/2017 | Lindstrom |
| 9,996,694 B2 | 6/2018 | Sethumadhavan et al. |
| 2008/0103996 A1* | 5/2008 | Forman ............... G06N 20/00 706/12 |
| 2009/0119095 A1 | 5/2009 | Beggelman et al. |
| 2010/0299301 A1* | 11/2010 | Busch ..................... G06N 5/02 706/46 |
| 2011/0289025 A1 | 11/2011 | Yan et al. |
| 2017/0330058 A1 | 11/2017 | Silberman et al. |

(Continued)

OTHER PUBLICATIONS

Sayyed M. Zahiri, "Emotion Detection on TV Show Transcripts with Sequence-Based Convolutional Neural Networks", Aug. 14, 2017 (Year: 2017).*

(Continued)

*Primary Examiner* — Michael J Huntley
*Assistant Examiner* — Imad Kassim
(74) *Attorney, Agent, or Firm* — James E. Boice; Gavin Giraud

(57) ABSTRACT

A method identifies and removes bias from a machine learning model. A user/computer inputs a plurality of input training data into a machine learning system to generate an output of labeled output data. The user/computer evaluates the labeled output data according to a consistency metric to associate the labeled output data with a corresponding consistency assessment. The user/computer selects each labeled output data having a consistency assessment indicating a consistency assessment that is greater than a predetermined threshold to form a labeled output data subset, and then creates additional labeling for the labeled output data subset. The user/computer utilizes the additional labeling to distinguish each labeled training data from labeled output data subset as being mislabeled and biased, and then adjusts the learning machine based on the labeled output data subset being mislabeled and biased.

18 Claims, 10 Drawing Sheets

(56) References Cited

U.S. PATENT DOCUMENTS

2019/0102921 A1* 4/2019 Mittal .................. G06F 16/248
2019/0392049 A1* 12/2019 Estes ................... G06Q 50/205

OTHER PUBLICATIONS

P. Mell et al., "The NIST Definition of Cloud Computing", National Institute of Standards and Technology, Information Technology Laboratory, Sep. 2011, pp. 1-7.

IBM Corporation, "Watson Visual Recognition", IBM Corporation, <https://www.ibm.com/watson/services/visual-recognition/>, Retrieved Nov. 9, 2018, pp. 1-4.

W. Cohen, "Bias-Variance in Machine Learning", Carnegie Mellon University, Machine Learning Department, Course 10601, Slides for Lecture, Bias-Variance Decomposition <http://curtis.ml.cmu.edu/w/courses/index.php/10-601_Bias-Variance>, Oct. 9, 2013, pp. 1-46.

Anonymous, "Bias Reduction for the Random Forest Learning Machines", IPCOM000021712D, Feb. 4, 2004, pp. 1-4.

Anonymous, "Machine Learning Algorithms for Smart Meter Diagnostics", IPCOM000242462D, Jul. 16, 2015, pp. 1-53.

Anonymous, "Image Moderation Using Machine Learning", IPCOM000252007D, Dec. 13, 2017, pp. 1-35.

* cited by examiner

DETECTING AND REDUCING BIAS IN MACHINE LEARNING MODELS

BACKGROUND

The present invention relates to the field of artificial intelligence, and specifically to machine learning models used in artificial intelligence. Still more particularly, the present invention relates to optimizing the performance of machine learning models used in artificial intelligence.

SUMMARY

In an embodiment of the present invention, a method identifies and removes bias from a machine learning model. A user/computer inputs a plurality of input training data into a machine learning system to generate an output of labeled output data. The user/computer evaluates the labeled output data according to a consistency metric in order to associate the labeled output data with a corresponding consistency assessment. The user/computer selects each labeled output data having a consistency assessment indicating a consistency assessment that is greater than a predetermined threshold to form a labeled output data subset. The user/computer creates additional labeling for the labeled output data subset in order to create additional labeling for the labeled output data subset. The user/computer utilizes the additional labeling in order to distinguish each labeled training data from labeled output data subset as being mislabeled and biased, and then adjusts the learning machine based on the labeled output data subset being mislabeled and biased.

In one or more embodiments, the method(s) described herein are performed by an execution of a computer program product and/or a computer system.

DETAILED DESCRIPTION

Figure 1:
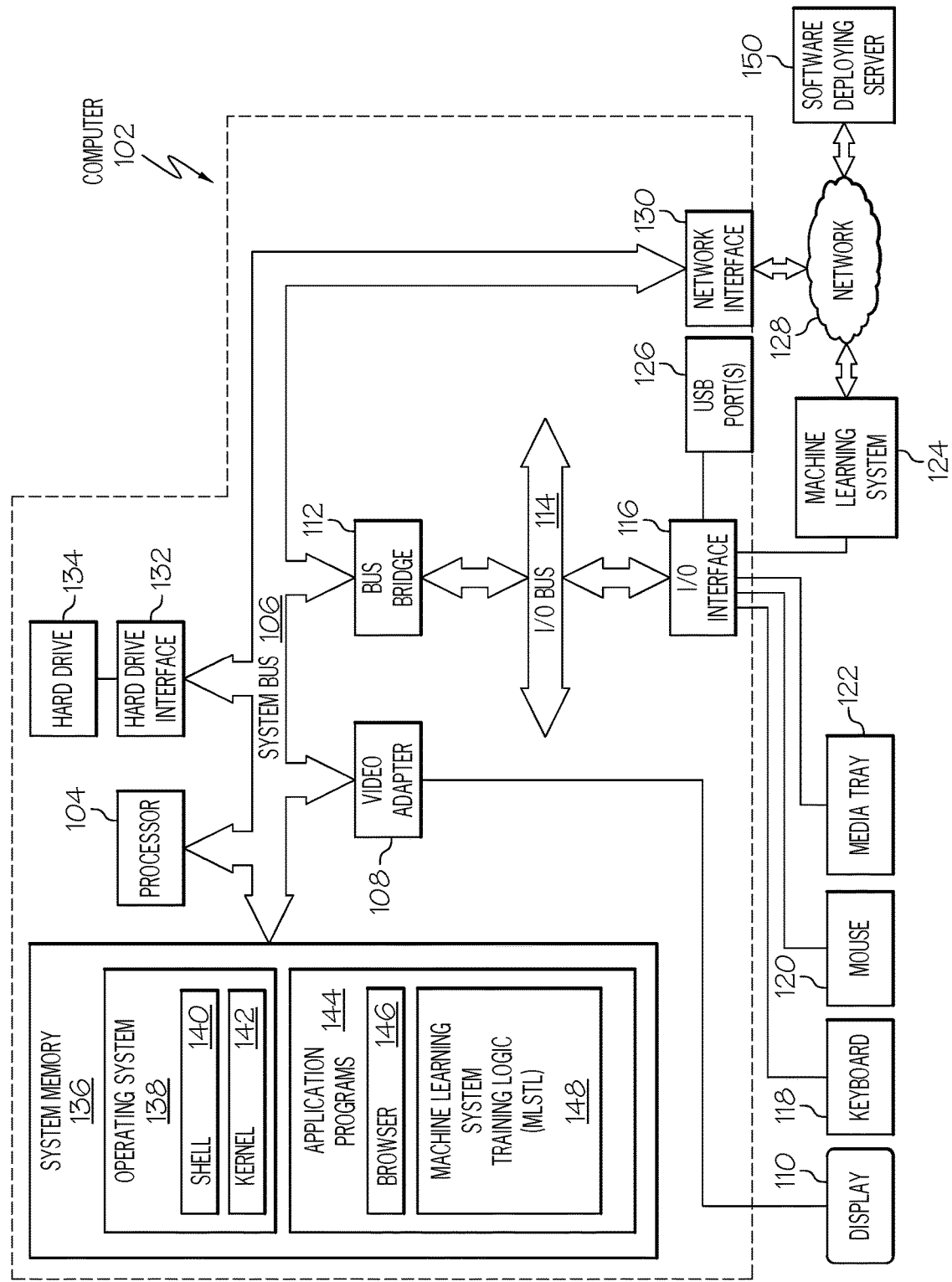
FIG. 1 depicts an exemplary system and network in which the present invention may be implemented.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also be stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function (s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or machine learning system 124.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a machine learning system 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 and/or the machine learning system 124 using a network interface 130 to a network 128. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Machine Learning System Training Logic (MLSTL) 148. MLSTL 148 includes code for implementing the processes described below, including those described in FIGS. 2-8. In one embodiment, computer 102 is able to download MLSTL 148 from software deploying server 150, including in an on-demand basis, wherein the code in MLSTL 148 is not downloaded until needed for execution. Note further that, in one embodiment of the present invention, software deploying server 150 performs all of the functions associated with the present invention (including execution of MLSTL 148), thus freeing computer 102 from having to use its own internal computing resources to execute MLSTL 148.

Also connected to (or alternatively, as part of) computer 102 is a machine learning system 124. In exemplary embodiments of the present invention, machine learning system is a traditional neural network (see FIG. 4), a convolutional neural network (see FIGS. 5-7), or another type of heuristic artificial intelligence.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

As machine learning (ML) solutions become pervasive in most business and consumer driven interactions, one issue that requires attention recently is that of bias in trained ML models.

Machine learning algorithms can be categorized into two major categories: Supervised ML algorithms and Unsupervised ML algorithms.

Supervised ML algorithms use methods that require as input labeled data from which they learn relevant features which can then be applied on new unseen data.

Unsupervised ML algorithms use methods that do not require any labeled data and can instead detect patterns in the data.

Most existing ML solutions fall into the category of supervised ML algorithms and thus, they require as input labeled data. This is true for text classification problems such as intent and sentiment labeling as well as image classification problems such as facial detection, pattern recognition, and object detection.

The quality of machine learning solutions is strongly dependent on the quality of the input data used for training the ML solution (i.e., GIGO: Garbage In Garbage Out). It follows that any bias in a trained ML solution would be "learned" from bias in the input labeled data. There are two kinds of biases: data bias and labeling bias.

Data bias corresponds to the scenario where the input data itself is biased, in that it has more examples that correspond to one category versus another.

Labeling bias corresponds to the scenario where the input data has the required variety across the categories, but the labeling by humans introduces bias.

Data bias can be detected and reduced by running statistical analysis on the data set and making sure it consists of representative and equal distribution of samples across the different categories. Labeling bias, on the other hand, is much harder to address as it is specific to several features particular to the humans doing the labeling. Some of the common human features that can introduce bias include various aspects of the human's background and views.

Figure 2:
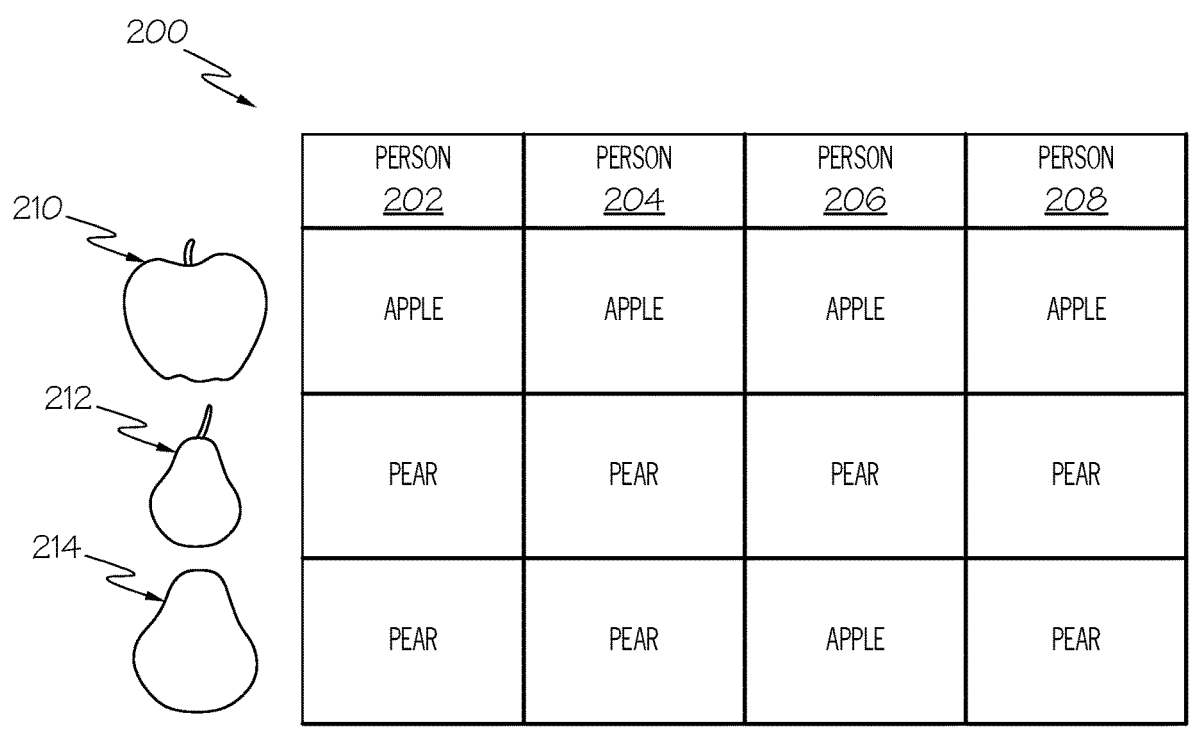
FIG. 2 illustrates a table of conflicting labels that are assigned to images by different persons in accordance with one or more embodiments of the present invention.

For example, consider the table 200 in FIG. 2. Assume that four persons (person 202, person 204, person 206, and person 208) are assigned the task of assigning labels to images that are used to train the machine learning system 124 shown in FIG. 1. Assume further that fruit image 210 depicts an apple, fruit image 212 depicts a pear, and fruit image 214 depicts a mountain apple. All four persons are in agreement for the labels assigned to fruit image 210 (apple) and fruit image 212 (pear). However, only person 206 recognizes fruit image 214 as being that of a mountain apple, which is indigenous to the State of Hawaii. Thus, if person 206 grew up in Hawaii (or is an expert in exotic fruits), then person 206 will recognize the fruit image 214 as being that of a mountain apple. The present invention takes advantage of this "outlier" label, rather than ignoring it (tossing it out), which is what a prior art system would do.

As such, the present invention presents a system and method for detecting and reducing bias in ML solutions, specifically labeling bias.

One or more embodiments of the present invention detect bias by evaluating the labeled data, identifying anomalies in labeling, cross-validating the anomalies labeling by other humans, and defining a multiplicity of valid labels. That is, one or more embodiments identify multiple persons who provide "outlier" labels to an object, and then identify similarities in these humans. Thus, in the case of the mountain apple, if the majority of the humans who identified the fruit in fruit image 214 as an "apple" are from Hawaii, while the majority of humans who misidentified the fruit in fruit image 214 as a "pear" are from states other than Hawaii, this common feature that is shared/not shared is used to provide evidence that the fruit in fruit image 214 is in fact an "apple", even though the gross majority of human labelers think it is a "pear".

Once multiple valid labels are identified, the method then seeks more validation of labeling by augmenting the training data as well as augmenting the human labelers to collect more samples of training data with equal variety of labeling.

Furthermore, if known, the method considers the profiles of the labelers (humans doing the labeling) and assigns the labels according to such profiles so at runtime, the more relevant label can be returned depending on the profile of the user requesting the classification.

Thus, the approach presented herein has an ability and is enabled to detect bias in labeled data by detecting and validating anomalies and then augmenting training data to change anomalies into valid labels.

A high-level overview of one or more embodiments of the present invention for detecting and reducing bias in machine learning solutions thus comprises: 1) Evaluating labeled training data to detect anomalies; 2) Cross-validating anomalies by prompting other humans to label them; 3) Differentiating valid labels due to bias from incorrect labels; and 4) Augmenting training data and human labelers to collect more representative labeled data to reduce bias.

In supervised ML algorithms, inter-annotator agreement (IAA) is a common metric used to evaluate the quality of the labeled data. IAA effectively measures agreement between annotators (or human labelers).

In general, ML practitioners try to improve IAA by reviewing annotations by multiple humans and validating them. One or more embodiments of the present invention leverages IAA for the objective of detecting possible bias across the annotators (or labelers), and then creates clusters of training data where IAA on such clusters would be better since the annotators associated with such clusters show similar bias.

Consider now an exemplary use of one or more embodiments of the present invention in which the challenge is to correctly identify and label the three different fruits shown in FIG. 2 as being either an apple or a pear.

Assume there are N annotators (persons providing labels) and k data samples, each sample being an image. Each of the N annotators will provide their opinion on whether the image includes a pear or an apple, thus leading to N*k labels.

Figure 3:
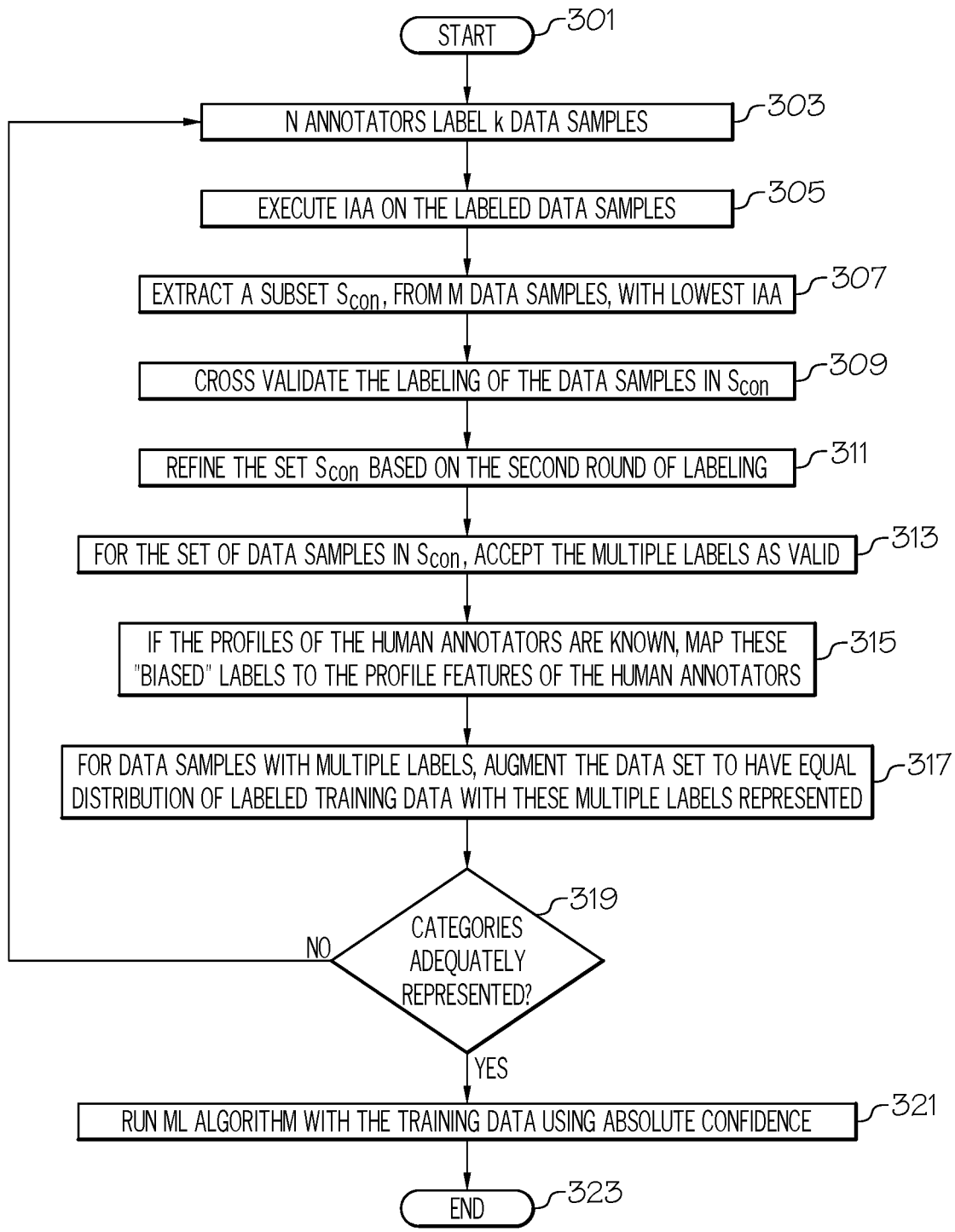
FIG. 3 is a high-level flow chart of one or more steps performed in accordance with one or more embodiments of the present invention.

With reference now to FIG. 3, a high-level flow chart of one or more embodiments of the present invention is presented.

After initiator block 301, N annotators label k data samples, as described in block 303.

As described in block 305, a system (e.g., computer 102 shown in FIG. 1) executes an IAA on the labeled data samples.

As described in block 307, the system extracts a subset $S_{con}$, from m data samples with the lowest IAA (and that is lower than some user specified threshold). This provides the set of data samples (images) which are most controversial, since different annotators labeled these samples differently.

As described in block 309, the system cross validates the labeling of the data samples in $S_{con}$. In one or more embodiments of the present invention, this is achieved by the system randomly permutating these samples and re-running them through a second round of labeling by the annotators (e.g., a subset of annotators). The system then applies non-significant variations of these data samples and presents back for a second round of labeling. In various embodiments of the present invention, some of these variations include changing the background of the image, or introducing other non-relevant objects in the image. For example, with text classification the variations could include adding punctuation marks or stop words. After applying these variations, the system runs these data samples through a second round of labeling/annotation.

Thus, the process described in block 309 rules out any mistakes in the labeling where the human intended to specify one label but chose another by accident.

As described in block 311, the system then refines the set $S_{con}$ based on the second round of labeling. As such, the data samples whose IAA increases beyond a threshold are removed from the set.

As described in block 313, for the set of data samples in $S_{con}$ the system accepts the multiple labels as valid.

As described in block 315, if the profiles of the human annotators are known, the system maps these "biased" labels to the profile features of the human annotators. As such, a data sample s in $S_{con}$ is effectively labeled with L1 for profile X and L2 for profile Y. The system then clusters these data samples per profile. As such, all data samples labeled differently that share the profile description use that label for classification.

As described in block 317, for data samples with multiple labels, the system augments the data set to have equal distribution of labeled training data with these multiple labels represented. If needed, the system augments (adds) additional human annotators (labelers) to get a more equal distribution of the labeled data. Alternatively, if the profile information is available, the system separates the ML problems into multiple independent ML problems, one for each profile. For each profile, the system will verify that there are sufficient labeled training data samples.

As shown in query block 319, a query is made as to whether enough data samples are obtained to represent the different categories as well as the different labels for data samples, and the profiles of the annotators used for the labeling are acquired. If not, the process reiteratively returns to block 303. If so, however, then the system runs an ML algorithm with the training data now acquired, as shown in block 321. This allows the method to return multiple valid labels for a data sample. The process ends at block 323.

In the above description, the invention is described as labeling training data. However, the process described herein is effective both in generating training data as well as testing unknown data. As such, the actual labeled data gets split into training and test data, and is split in equal distribution across the multiple categories and multiple labels for the data samples.

Once the ML solution is trained, then at runtime, if a data sample is classified with multiple categories, then all categories are returned. If user profile information is available, then the multiple categories are returned and also, a ranked presentation is applied where the category most relevant to the user profile is returned first (or highlighted).

The machine learning system 124 shown in FIG. 1 that learns how to evaluate data may be a neural network such as a Traditional Neural Network (TNN), a Convolutional Neural Network (CNN), or any other machine learning system. In a preferred embodiment, a TNN is used to evaluate text/numeric data, while a CNN is used to evaluate an image.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons are never technically "inhibitory", but are only "excitatory" to varying degrees.

In a TNN, neurons are arranged in layers, known as an input layer, hidden layer(s), and an output layer. The input layer includes neurons/nodes that take input data, and send it to a series of hidden layers of neurons, in which all neurons from one layer in the hidden layers are interconnected with all neurons in a next layer in the hidden layers. The final layer in the hidden layers then outputs a computational result to the output layer, which is often a single node for holding vector information.

Figure 4:
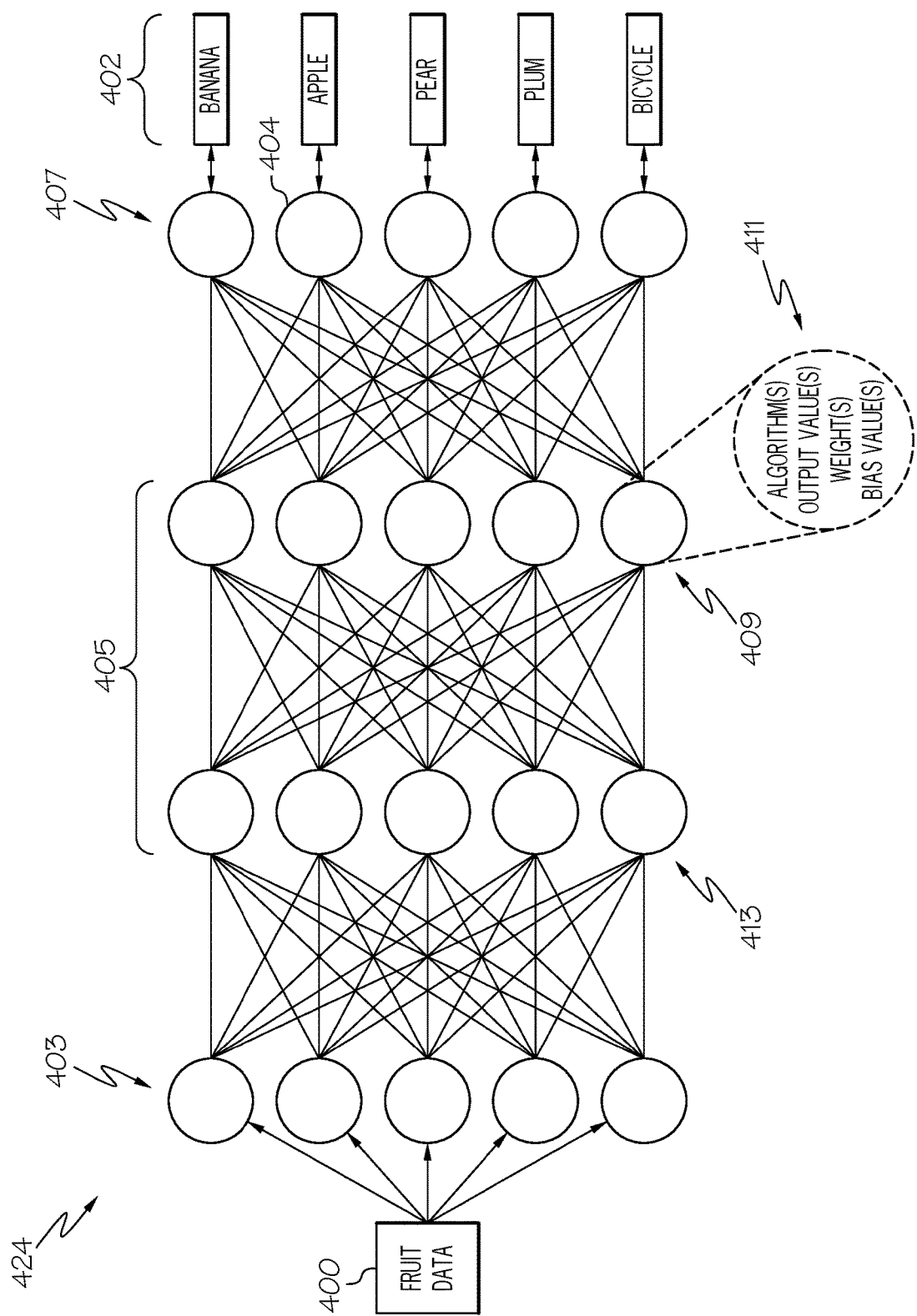
FIG. 4 depicts an exemplary traditional neural network as used in one or more embodiments of the present invention.

With reference now to FIG. 4, a Traditional Neural Network (TNN) 424 used to evaluate data in one or more embodiments of the present invention is presented. For example, fruit data 400 is text and/or data that describes features of a particular type of fruit, such as color, shape, texture, sweetness, tartness, nutrients, growing regions, etc.

The electronic neurons in TNN 424 are arranged in layers, known as an input layer 403, hidden layers 405, and an output layer 407. The input layer 403 includes neurons/nodes that take input data, and send it to a series of hidden layers of neurons (e.g., hidden layers 405), in which neurons from one layer in the hidden layers are interconnected with all neurons in a next layer in the hidden layers 405. The final layer in the hidden layers 405 then outputs a computational result to the output layer 407, which is often a single node for holding vector information. In an embodiment of the present invention, each neuron in the output layer 407 is associated with a particular label from labels 402, as shown in FIG. 4.

As just mentioned, each node in the depicted TNN 424 represents an electronic neuron, such as the depicted neuron 409. As shown in block 411, each neuron (including neuron 409) functionally includes at least three features: a mathematical function, an output value, a weight, and a bias value.

The mathematical function is a mathematic formula for processing data from one or more upstream neurons. For example, assume that one or more of the neurons depicted in the middle hidden layers 405 send data values to neuron 409. Neuron 409 then processes these data values by executing the mathematical function shown in block 411, in order to create one or more output values, which are then sent to another neuron, such as another neuron within the hidden layers 405 or a neuron in the output layer 407. Each neuron also has a weight that is specific for that neuron and/or for other connected neurons. Furthermore, the output value(s) are added to bias value(s), which increase or decrease the output value, allowing the TNN 424 to be further "fine tuned".

For example, assume that neuron 413 is sending the results of its analysis of a piece of data to neuron 409. Neuron 409 has a first weight that defines how important data coming specifically from neuron 413 is. If the data is important, then data coming from neuron 413 is weighted heavily, and/or increased by the bias value, thus causing the mathematical function (s) within neuron 409 to generate a higher output, which will have a heavier impact on neurons in the output layer 407. Similarly, if neuron 413 has been determined to be significant to the operations of neuron 409, then the weight in neuron 413 will be increased, such that neuron 409 receives a higher value for the output of the mathematical function in the neuron 413. Alternatively, the output of neuron 409 can be minimized by decreasing the weight and/or bias used to affect the output of neuron 409. These weights/biases are adjustable for one, some, or all of the neurons in the TNN 424, such that a reliable output will result from output layer 407. In one or more embodiments of the present invention, finding the values of weights and bias values is done automatically by training the neural network. In one or more embodiments of the present invention, manual adjustments are applied to tune the hyperparameters such learning rate, dropout, regularization factor and so on. As such, training a neural network involves running forward propagation and backward propagation on multiple data sets until the optimal weights and bias values are achieved to minimize a loss function. The loss function measures the difference in the predicted values by the neural network and the actual labels for the different inputs.

When manually adjusted, the weights are adjusted by the user, sensor logic, etc. in a repeated manner until the output from output layer 407 matches expectations. For example, assume that input layer 403 receives inputs that describe a mountain apple. In an exemplary input, the input to input layer 403 contains values that describe a mountain apple. If TNN 424 has been properly trained (by adjusting the mathematical function (s), output value(s), weight(s), and biases in one or more of the electronic neurons within TNN 424) to output a 5-tuple output vector (e.g., 0.2, 0.9, 0.2, 0.3, 0.4) to the output layer 407, indicating that the neuron 404 that is associated with the label "apple" has the highest value (0.9), then it indicates that the fruit data 400 describes some type of apple (a "mountain apple" in this case).

When automatically adjusted, the weights (and/or mathematical function) are adjusted using "back propagation", in which weight values of the neurons are adjusted by using a "gradient descent" method that determines which direction each weight value should be adjusted to. This gradient descent process moves the weight in each neuron in a certain direction until the output from output layer 407 improves (e.g., gets closer to outputting a highest value to neuron 404, thus indicating that the fruit data 400 describes a mountain apple).

In one or more embodiments of the present invention, a Convolutional Neural Network (CNN) is utilized to analyze images.

A CNN is similar to a TNN in that both utilize interconnected electronic neurons. However, a CNN is different from a TNN in that 1) a CNN has neural layers whose sizes are based on filter sizes, stride values, padding values, etc. (see FIGS. 6) and 2) a CNN utilizes a convolution scheme to analyze image data (see FIG. 7). A CNN gets its "convolutional" name based on a convolution (i.e., a mathematical operation on two functions to obtain a result) of filtering and pooling pixel data (a mathematical operation on two functions) in order to generate a predicted output (obtain a result).

Figure 5:
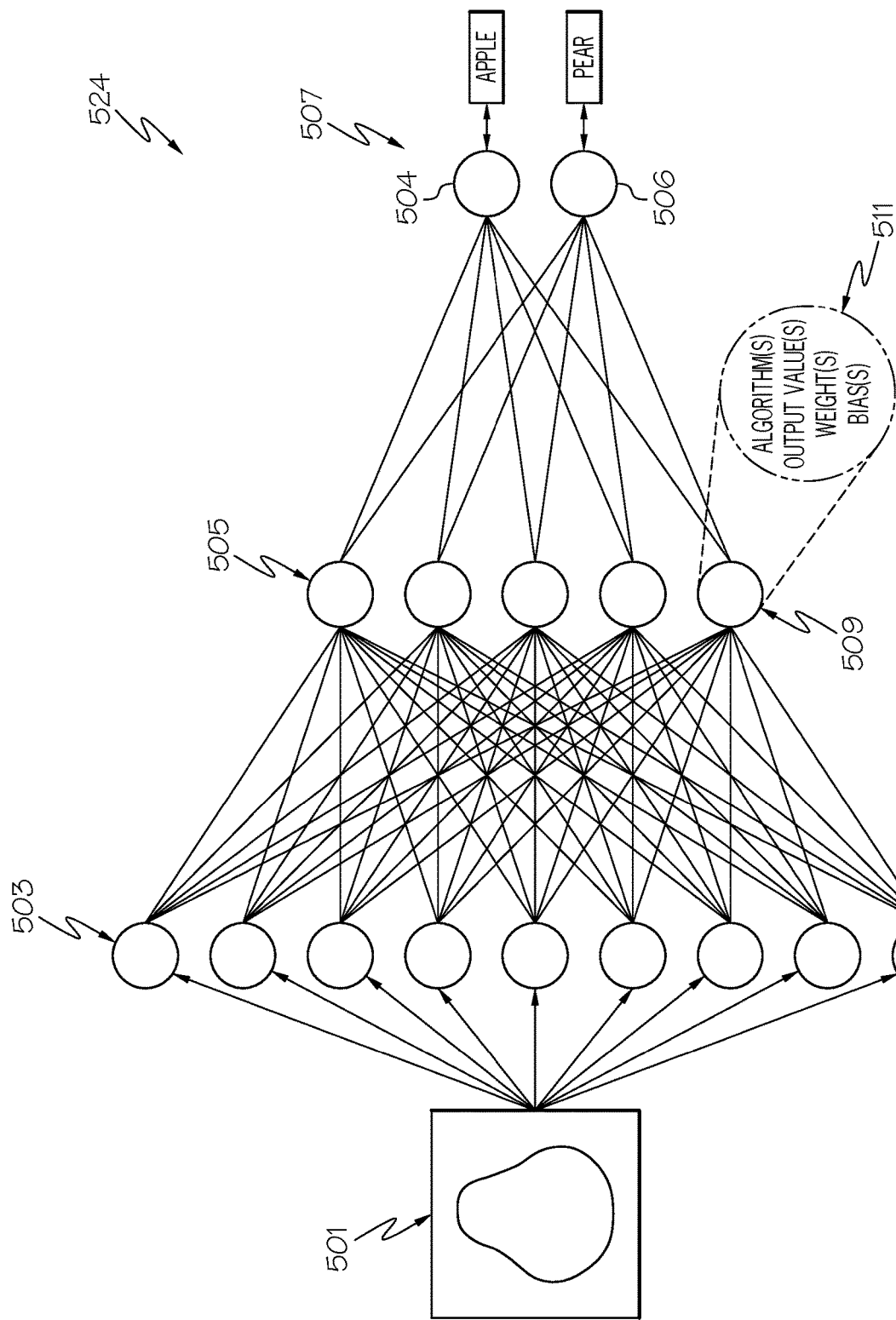
FIG. 5 illustrates an exemplary Convolutional Neural Network (CNN) as used in one or more embodiments of the present invention.

With reference now to FIG. 5, an exemplary CNN 524 is presented. Each depicted node in FIG. 5 represents a neuron (i.e., an electronic neuron). In accordance with one or more embodiments of the present invention, an input layer 503 includes neurons that receive data that describes pixels from a photograph, such as fruit image 501. The neurons from the input layer 503 of the CNN 524 connect neurons in a middle layer 505, which connect to neurons in the output layer 507.

As just mentioned, each node in the depicted CNN 524 represents an electronic neuron, such as the depicted neuron 509. As shown in block 511, each neuron (including neuron 509) functionally includes at least four features: a mathematical function, an output value, a weight, and a bias (similar to those described in neuron nodes in the TNN 424 shown in FIG. 4.

For example, assume that neuron 513 is sending the results of its analysis of a piece of the fruit image 501 to neuron 509. Neuron 509 has a first weight that defines how important data coming specifically from neuron 513 is. If the data is important, then data coming from neuron 513 is weighted heavily, thus causing the mathematical function (s) within neuron 509 to generate a higher output, which will have a heavier impact on neurons in the output layer 507. Similarly, if neuron 513 has been determined to be significant to the operations of neuron 509, then the weight in neuron 513 will be increased, such that neuron 509 receives a higher value for the output of the mathematical function in the neuron 513. These weights are adjustable for one, more, or all of the neurons in the CNN 524, such that a reliable output will result from output layer 507. In one or more embodiments of the present invention, finding the values of weights and bias values is done automatically by training the neural network. In one or more embodiments of the present invention, manual adjustments are applied to tune the hyperparameters such learning rate, dropout, regularization factor and so on. As such, training a neural network involves running forward propagation and backward propagation on multiple data sets until the optimal weights and bias values are achieved to minimize a loss function. The loss function measures the difference in the predicted values by the neural network and the actual labels for the different inputs.

When manually adjusted, the weights are adjusted by the user, sensor logic, etc. in a repeated manner until the output from output layer 507 matches expectations. For example, assume that input layer 503 receives pixel values (color, intensity, shading, etc.) from pixels in a photograph of a mountain pear (fruit image 501). If the output from output layer 507 includes neuron/node 504, which is associated with "apples", then the weights (and/or the mathematical function and/or biases in "upstream" nodes/neurons) are adjusted until neuron/node 504 contains the highest value in the output layer 507 when pixel data from a photograph of a mountain apple is input into input layer 503.

When automatically adjusted, the weights (and/or mathematical functions and/or biases) are adjusted using "back propagation", in which weight values and/or biases and/or mathematical functions of the neurons are adjusted by using a "gradient descent" method that determines which direction each weight value should be adjusted to. This gradient descent process moves the weight in each neuron in a certain direction until the output from output layer 507 improves (e.g., neuron 504 has a higher value than node 506 that is associated with the label "pear".

Figure 6:
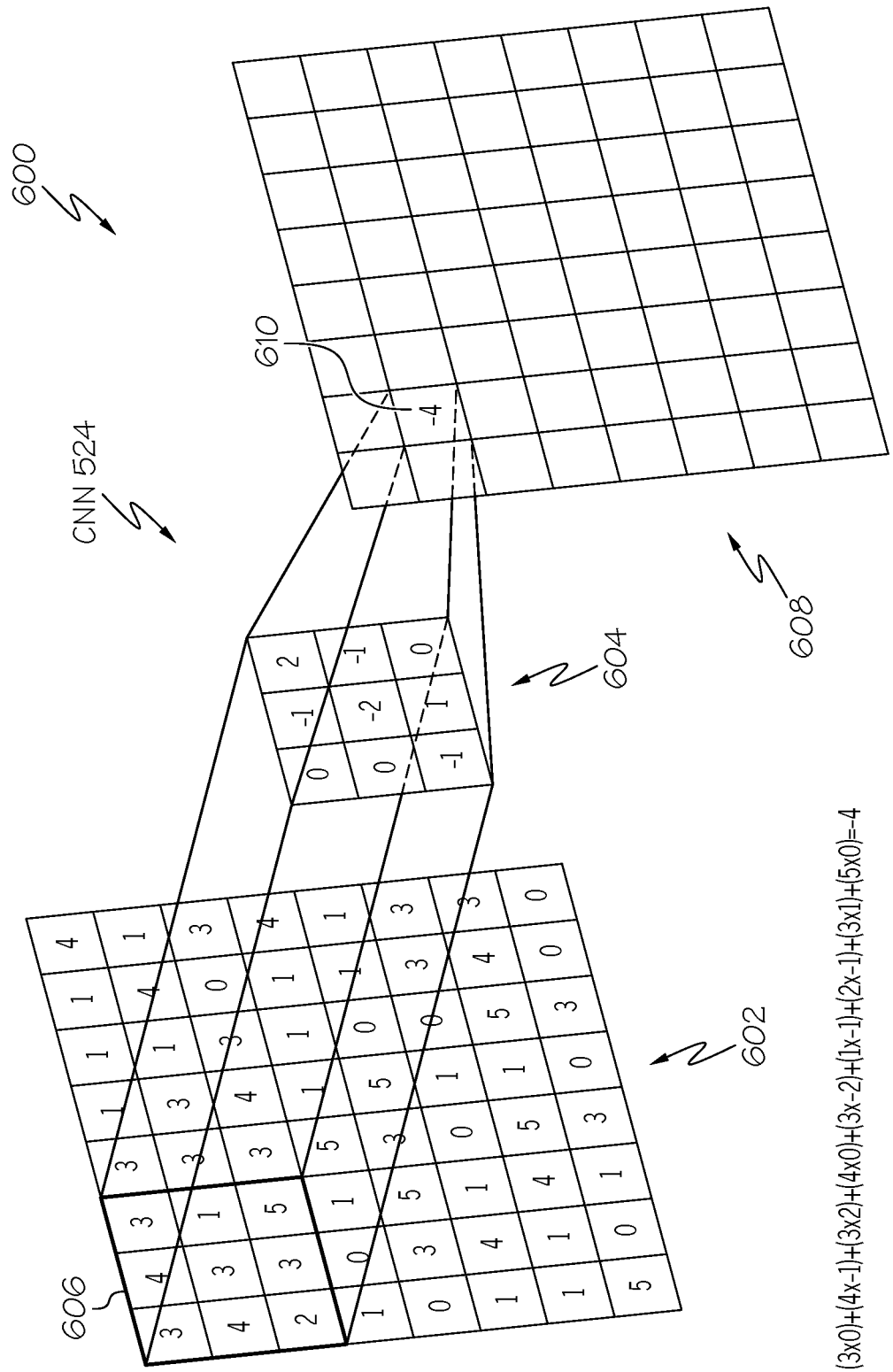
FIG. 6 depicts additional functionality detail of the CNN illustrated in FIG. 5.
Figure 7:
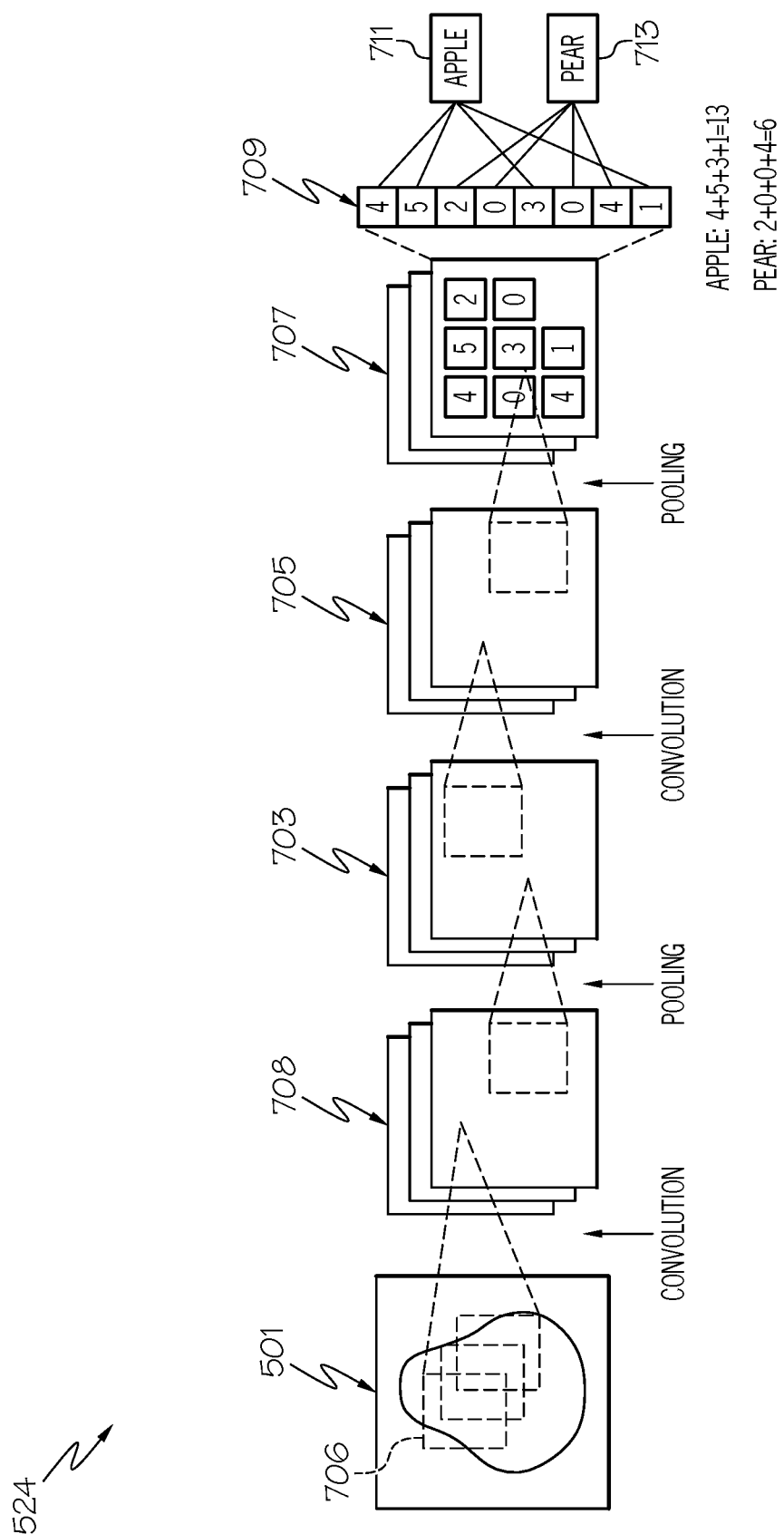
FIG. 7 illustrates an exemplary photo image being evaluated/inferred using a CNN in accordance with one or more other embodiments of the present invention.

A CNN process includes 1) a convolution stage (depicted in FIG. 6), followed by a 2) pooling stage and a classification stage (depicted in FIG. 7).

With reference now to FIG. 6, a convolution/pooling scheme to analyze image data is presented in CNN convolution process 500. As shown in FIG. 6, pixel data from a photographic image (e.g., fruit image 501 shown in FIG. 5) populates an input table 602. Each cell in the input table 602 represents a value of a pixel in the photograph. This value is based on the color and intensity for each pixel. A subset of pixels from the input table 602 is associated with a filter 604. That is, filter 604 is matched to a same-sized subset of pixels (e.g., pixel subset 606) by sliding the filter 604 across the input table 602. The filter 604 slides across the input grid at some predefined stride (i.e., one or more pixels). Thus, if the stride is "1", then the filter 604 slides over in increments of one (column) of pixels. In the example shown in FIG. 6, this results in the filter 604 sliding over the subset of pixels shown as pixel subset 606 (3, 4, 3, 4, 3, 1, 2, 3, 5 when read from left to right for each row) followed by filter 604 sliding over the subset of pixels just to the right (4, 3, 3, 3, 1, 3, 2, 5, 3). If the stride were "2", then the next subset of pixels that filter 604 would slide to would be (3, 3, 1, 1, 3, 3, 5, 3, 4).

Filter 604 is applied against each pixel subset using a mathematical formula. That is, the values in the filter 604 are added to, subtracted from, multiplied by, divided by, or otherwise used in a mathematical operation and/or algorithm with the values in each subset of pixels. For example, assume that the values in filter 604 are multiplied against the pixel values shown in pixel subset 606 ((3x0)+(4x−1)+(3x2)+(4x0)+(3x−2)+(1x−1)+(2x−1)+(3x1)+(5x0)) to arrive at the value of −4. This value is then used to populate feature map 608 with the value of −4 in cell 610.

In a preferred embodiment, the convolution step also includes use of an activation function, which transforms the output of the convolution operation into another value. One purpose of the use of an activation function is to create nonlinearity in the CNN. A choice of specific activation function depends on an embodiment. Popular choices of an activation function include a rectified linear unit (ReLU), a leaky ReLU, a sigmoid function, a tanh function, and so on.

In an embodiment, each subset of pixels uses a same filter. However, in a preferred embodiment, the filter used by each subset of pixels is different, thus allowing a finer level of granularity in creating the feature map.

With reference now to FIG. 7, the pooling stage and a classification stage (as well as the convolution stage) of a CNN 524 during inference processing is depicted. That is, once the CNN 524 is optimized by adjusting weights and/or mathematical functions and/or biases in the neurons (see FIG. 5), by adjusting the stride of movement of the pixel subset 606 (see FIG. 6), and/or by adjusting the filter 604 shown in FIG. 6, then it is trusted to be able to recognize similar objects in similar photographs. This optimized CNN is then used to infer (hence the name inference processing) that the object in a new photograph is the same object that the CNN has been trained to recognize.

As shown in FIG. 7, assume that pixels from a photograph (fruit image 501) are used as inputs to the input table 602 shown in FIG. 6, using a CNN that has been previously defined and optimized to recognize the image of a mountain apple. Assume further that a series of pixel subsets, including the pixel subset 706 (analogous to pixel subset 606 shown in FIG. 6) are convolved (using the process described in FIG. 6), thus resulting in a set of feature maps 708 (analogous to feature map 608 shown in FIG. 6). Once the feature maps 708 are generated, they are pooled into smaller pooled tables 703, in order to reduce the dimensionality of the values, thereby reducing the number of parameters and computations required in the CNN process. Once these pooled tables 703 are created, they themselves are then convoluted to create new (and even more compressed) feature maps 705, which are then pooled to create even more compressed pooled tables 707.

The pooled tables 707 (which in an embodiment is actually a single table) are "unrolled" to form a linear vector, shown in FIG. 7 as a fully connected layer 709. Fully connected layer 709 is connected to a prediction output, including prediction output 711 (for a pear) and prediction output 713 (for an apple).

For example, assume that for a prediction output to be considered accurate, it must have an arbitrarily chosen total value of 10 or greater for the sum of values from cells in the fully connected layer 709 to which it is connected. As such, the prediction output 711 is connected to cells in the fully connected layer 509 that have the values of 4, 5, 3, and 1, resulting in a sum total of 13. Thus, the CNN 524 concludes that fruit image 501 includes an image of an apple. In one or more embodiments, an output function, such as a softmax function, amplifies larger output values, attenuates smaller output values, and normalizes all output values in order to ensure that their total sum is one. That is, rather than assigning an arbitrary number (e.g., 10) as being what the sum total of values in certain cells from the connected layer 709 must exceed in order to indicate that a particular entity (e.g., an apple) is portrayed in the new photograph, an output function such as a softmax function dynamically adjusts the output values and then normalizes them, such that they sum up to 1.0 or some other predetermined number. Thus, while the described values shown in FIG. 7 describe the concept of output values describing entities in the photographs, in practice a static threshold value is not used in certain embodiments. Rather, in this alternative/preferred embodiment, the system utilizes a normalized summation (as just described), in order to further control the output characteristics, thus more accurately determining the label of the object in the photograph.

The prediction output 713 for a pear is only 6 (2+0+0+4) based on the cells in the fully connected layer 709 to which it is attached. However, if the pixels in the fruit image 501 were of a pear, then the fully connected layer 709 (if properly trained) would result in the values of the cells in the fully connected layer 709 that are connected to the prediction output 711 to total less than 10, while the values of the cells in the fully connected layer 709 that are connected to the prediction output 713 would be more than 10.

While FIG. 7 depicts that a collection of values from the fully connected layer 709 are used to identify what is in fruit image 501, in another embodiment each node/neuron in the fully connected layer 709 is assigned a different label, as depicted in FIG. 4 for a TNN 424.

As discussed above with regard to FIG. 7, inference is the process of using a trained CNN to recognize certain objects from a photograph or other data. In the example in FIG. 7, pixels from fruit image 501 are input into a trained CNN (e.g., CNN 524), resulting in the identification and/or labeling (for display on the photograph/fruit image 501) a particular object, such as the apple.

That is, a CNN is trained to recognize a certain object (e.g., an apple in a photograph). By using a new photograph as an input to the trained CNN, an apple in the new photograph is also identified/labeled using a process known as inferencing. This inferencing occurs in real time, and recognizes specific objects (e.g., an apple) by running the new photograph through the trained CNN.

Figure 8:
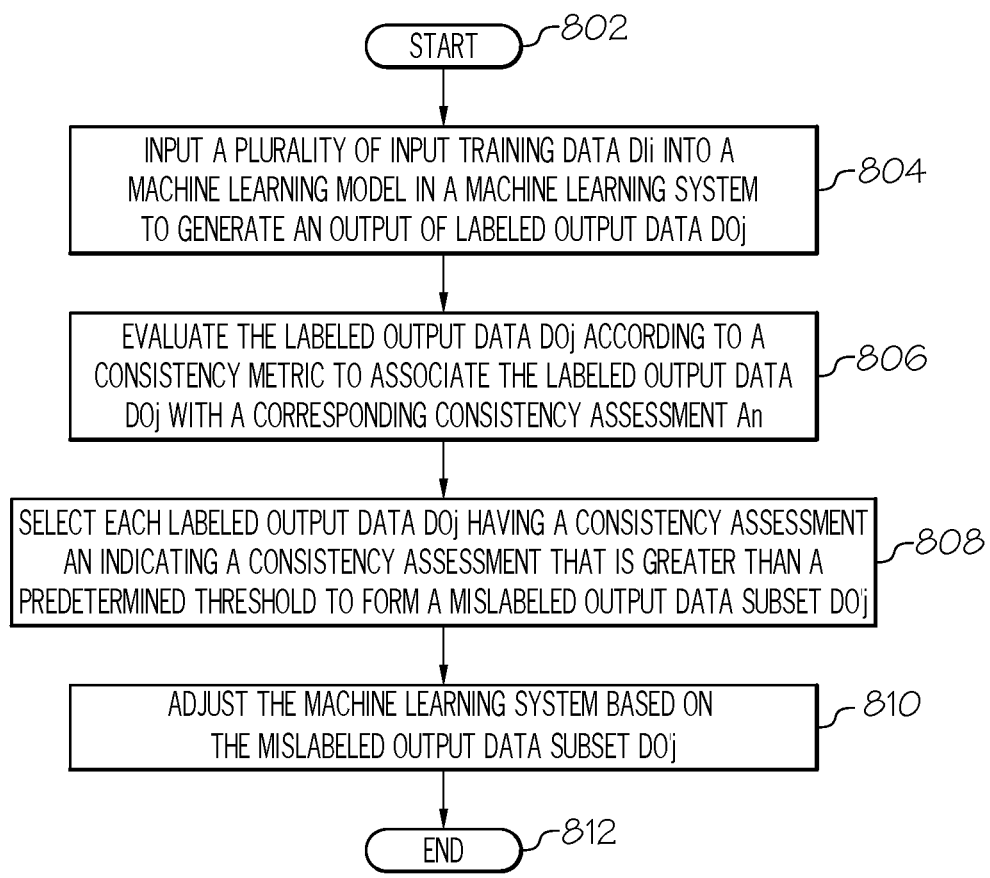
FIG. 8 is a high-level flow chart of one or more steps performed in accordance with one or more embodiments of the present invention.

With reference now to FIG. 8, a high-level flow chart of one or more operations performed by one or more embodiments of the present invention is presented.

After initiator block 802 one or more processors (e.g., processor 104 shown in FIG. 1) and/or a user inputs a plurality of input training data DIi into a machine learning model in a machine learning system to generate an output of labeled output data DOj, as depicted in block 804. For example, pixel data from fruit image 501 is input into the input layer 503 of the CNN 524 shown in FIG. 5).

As described in block 806, the system (e.g., the processors and/or the user) evaluates the labeled output data DOj according to a consistency metric to associate the labeled output data DOj with a corresponding consistency assessment An. That is, a determination is made as to whether all of the labelers/persons/annotators agree as to what the input data/photo illustrate.

As described in block 808, the system selects each labeled output data DOj having a consistency assessment An indicating a consistency assessment that is greater than a predetermined threshold to form a mislabeled output data subset DO'j. That is, the "outlier" label ("mountain apple" instead of "pear") is identified as mislabeled output data. However, if this "mislabeling" is consistent enough among a particular cohort of labelers (e.g., those who grew up in Hawaii and know what a mountain apple is), then their consistency in "mislabeling" the mountain apple leads the system to interpret this "mislabeled output data subset" as actually being accurately labeled.

As described in block 810, the system then adjusts the machine learning system based on the mislabeled output data subset DO'j.

The flow-chart ends at terminator block 812.

In an embodiment of the present invention, the mislabeled output data subset DO'j is a result of bias by human labelers for the input training data DIi. For example, the bias may be based on a labeler's background (e.g., growing up in Hawaii in order to be able to identity/label a mountain apple), education (e.g., having a degree in botany), etc.

In an embodiment of the present invention, the system creates additional labeling for the labeled output data subset DO'j to create additional labeling AD'i for the labeled output data subset DO'j, and then utilizes the additional labeling AD'i to distinguish each labeled training data from labeled output data subset DO'j as being properly labeled. That is the additional labeling indicates that the labeling, which was previously considered to be improper/incorrect, is now indicated as being proper/accurate.

In an embodiment of the present invention, the system (e.g., computer 102) adjusts the machine learning model by collecting and inputting additional representative training data into the machine learning system. That is, once the system recognizes that the "outlier" data is in fact accurate, then the system retrieves and inputs similar inputs (e.g., other pictures of mountain apples) into the machine learning system (see FIG. 5), thus teaching the machine learning system how to recognize other examples of the image/data.

In an embodiment of the present invention, the consistency metric is an inter-annotator agreement (IAA) between annotators that evaluate the labeled output data DOj. That is, the annotators (human labelers) have an IAA that measures differences in labels provided by the annotators, in order to reconcile such differences using the process depicted in FIG. 8.

In an embodiment of the present invention, the machine learning system is a traditional neural network, wherein the plurality of input training data DIi is generated from a data document (see FIG. 4).

In an embodiment of the present invention, the machine learning system is a convolutional neural network, and the plurality of input training data DIi is generated from a photograph (see FIG. 5).

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service' s provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
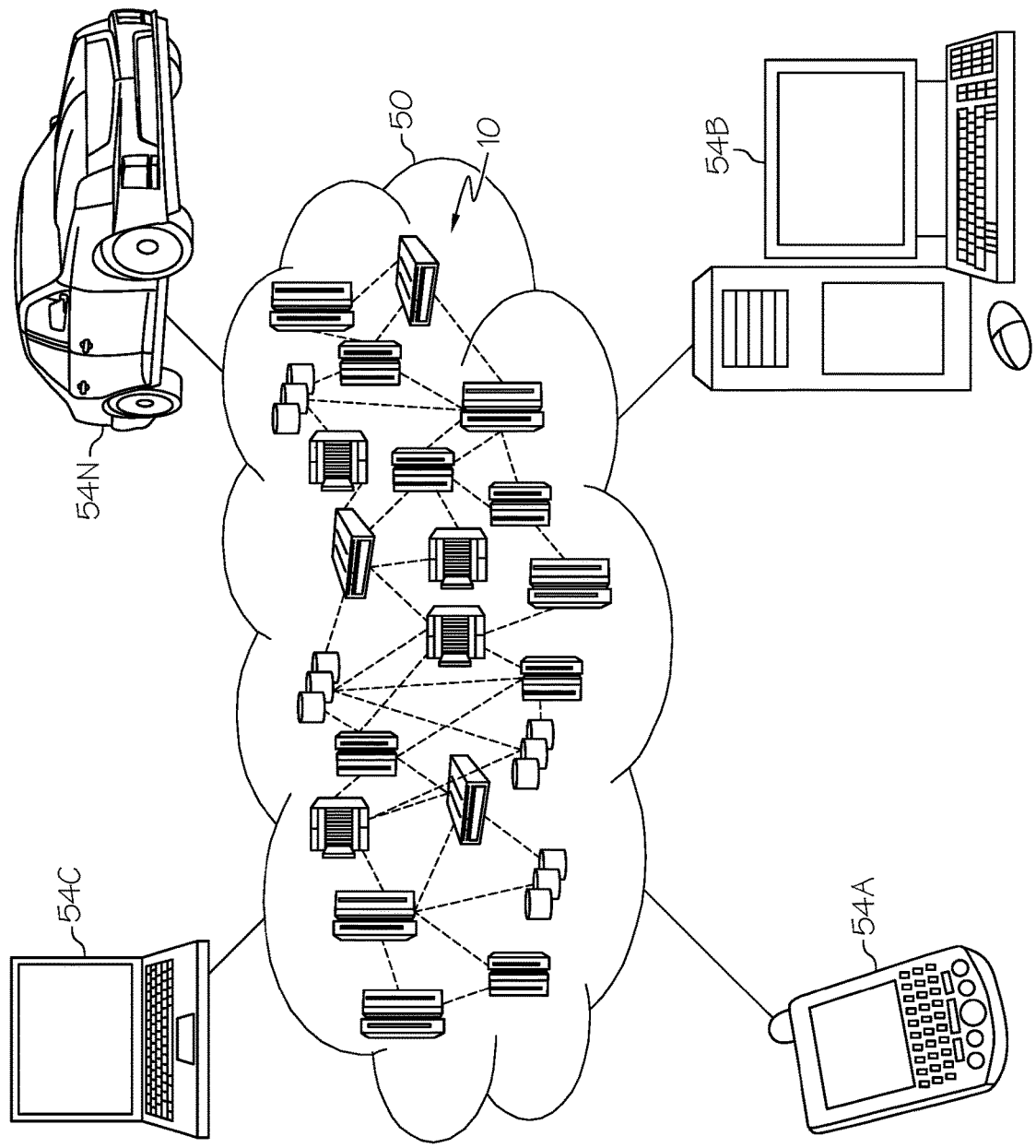
FIG. 9 depicts a cloud computing environment according to an embodiment of the present invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 9 are intended to be illustrative only and that computing nodes 10 and cloud computing environment 50 can communicate with any type of computerized device over any type of network and/or network addressable connection (e.g., using a web browser).

Figure 10:
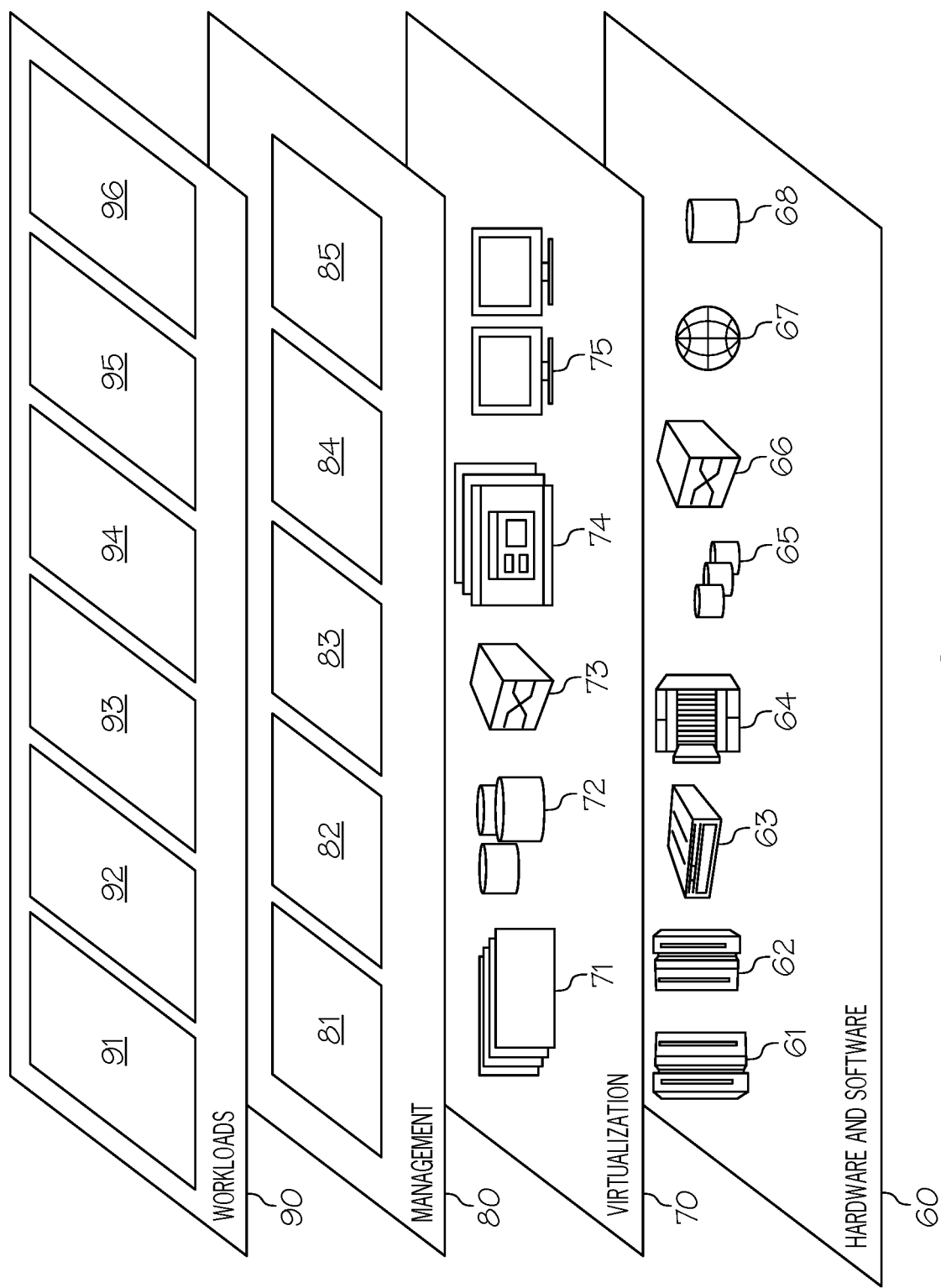
FIG. 10 depicts abstraction model layers of a cloud computer environment according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and machine learning processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   inputting a plurality of input training data into a machine learning model in a machine learning system to generate an output of labeled output data;
   evaluating the labeled output data according to a consistency metric to associate the labeled output data with a corresponding consistency assessment;
   selecting each labeled output data having a consistency assessment indicating a consistency assessment that is greater than a predetermined threshold to form a mislabeled output data subset; identifying the mislabeled output data subset as being generated by the machine learning system based on a particular input training data from the plurality of input training data, wherein the particular input training data is labeled by a particular labeling person, and wherein the particular labeling person has a personal profile that identifies the particular labeling person as having personal knowledge of an appearance of an object that the machine learning system is being trained to recognize;
   redefining the mislabeled output data subset as an outlier labeled output data subset that correctly describes the object, wherein the mislabeled output data is redefined as the outlier labeled output data subset based on the personal profile of the labeling person;
   adjusting the machine learning system based on the outlier labeled output data subset, wherein the adjusted machine learning system is a trained machine learning system for identifying the object;
   determining that the trained machine learning system outputs multiple different categories that describe the object;
   comparing features from the personal profile of the particular labeling person to the multiple different categories that describe the object;
   ranking the multiple different categories that describe the object based on a relevance of the features from the personal profile to each of the multiple categories that describe the object; and
   presenting the multiple different categories in a ranked order based on the relevance of the features from the personal profile to each of the multiple categories that describe the object.

2. The method of claim 1, further comprising:
   creating additional labeling for the mislabeled output data subset to create additional labeling for the mislabeled output data subset; and
   utilizing the additional labeling to distinguish each labeled training data from the mislabeled output data subset as being properly labeled.

3. The method of claim 1, further comprising:
   adjusting the machine learning model by collecting and inputting additional representative training data into the machine learning system.

4. The method of claim 1, wherein the consistency metric is an inter-annotator agreement (IAA) between annotators that evaluate the labeled output data.

5. The method of claim 1, wherein the machine learning system is a traditional neural network, and wherein the plurality of input training data is generated from a data document.

6. The method of claim 1, wherein the machine learning system is a convolutional neural network, and wherein the plurality of input training data is generated from a photograph.

7. A computer program product comprising a computer readable storage medium having program code embodied therewith, wherein the computer readable storage medium is not a transitory signal per se, and wherein the program code is readable and executable by a processor to perform a method comprising:
   inputting a plurality of input training data into a machine learning model in a machine learning system to generate an output of labeled output data;
   evaluating the labeled output data according to a consistency metric to associate the labeled output data with a corresponding consistency assessment;

selecting each labeled output data having a consistency assessment indicating a consistency assessment that is greater than a predetermined threshold to form a mislabeled output data subset;

identifying the mislabeled output data subset as being generated by the machine learning system based on a particular input training data from the plurality of input training data, wherein the particular input training data is labeled by a particular labeling person, and wherein the particular labeling person has a personal profile that identifies the particular labeling person as having personal knowledge of an appearance of an object that the machine learning system is being trained to recognize;

redefining the mislabeled output data subset as an outlier labeled output data subset that correctly describes the object, wherein the mislabeled output data is redefined as the outlier labeled output data subset based on the personal profile of the labeling person;

adjusting the machine learning system based on the outlier labeled output data subset, wherein the adjusted machine learning system is a trained machine learning system for identifying the object;

determining that the trained machine learning system outputs multiple different categories that describe the object;

comparing features from the personal profile of the particular labeling person to the multiple different categories that describe the object;

ranking the multiple different categories that describe the object based on a relevance of the features from the personal profile to each of the multiple categories that describe the object; and presenting the multiple different categories in a ranked order based on the relevance of the features from the personal profile to each of the multiple categories that describe the object.

8. The computer program product of claim 7, wherein the method further comprises:

creating additional labeling for the mislabeled output data subset to create additional labeling for the mislabeled output data subset; and utilizing the additional labeling to distinguish each labeled training data from the mislabeled output data subset as being properly labeled.

9. The computer program product of claim 7, wherein the method further comprises:

adjusting the machine learning model by collecting and inputting additional representative training data into the machine learning system.

10. The computer program product of claim 7, wherein the consistency metric is an inter-annotator agreement (IAA) between annotators that evaluate the labeled output data.

11. The computer program product of claim 7, wherein the machine learning system is a traditional neural network, and wherein the plurality of input training data is generated from a data document.

12. The computer program product of claim 7, wherein the machine learning system is a convolutional neural network, and wherein the plurality of input training data is generated from a photograph.

13. The computer program product of claim 7, wherein the program code is provided as a service in a cloud environment.

14. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:

inputting a plurality of input training data into a machine learning model in a machine learning system to generate an output of labeled output data;

evaluating the labeled output data according to a consistency metric to associate the labeled output data with a corresponding consistency assessment;

selecting each labeled output data having a consistency assessment indicating a consistency assessment that is greater than a predetermined threshold to form a mislabeled output data subset;

identifying the mislabeled output data subset as being generated by the machine learning system based on a particular input training data from the plurality of input training data, wherein the particular input training data is labeled by a particular labeling person, and wherein the particular labeling person has a personal profile that identifies the particular labeling person as having personal knowledge of an appearance of an object that the machine learning system is being trained to recognize;

redefining the mislabeled output data subset as an outlier labeled output data subset that correctly describes the object, wherein the mislabeled output data is redefined as the outlier labeled output data subset based on the personal profile of the labeling person; and adjusting the machine learning system based on the outlier labeled output data subset, wherein the adjusted machine learning system is a trained machine learning system for identifying the object;

determining that the trained machine learning system outputs multiple different categories that describe the object;

comparing features from the personal profile of the particular labeling person to the multiple different categories that describe the object;

ranking the multiple different categories that describe the object based on a relevance of the features from the personal profile to each of the multiple categories that describe the object; and presenting the multiple different categories in a ranked order based on the relevance of the features from the personal profile to each of the multiple categories that describe the object.

15. The computer system of claim 14, wherein the method further comprises:

creating additional labeling for the mislabeled output data subset to create additional labeling for the mislabeled output data subset; and utilizing the additional labeling to distinguish each labeled training data from the mislabeled output data subset as being properly labeled.

16. The computer system of claim 14, wherein the method further comprises:

adjusting the machine learning model by collecting and inputting additional representative training data into the machine learning system.

17. The computer system of claim 14, wherein the consistency metric is an inter-annotator agreement (IAA) between annotators that evaluate the labeled output data.

18. The computer system of claim 14, wherein the stored program instructions are provided as a service in a cloud environment.

* * * * *